US007007153B1

(12) United States Patent
Berenbaum et al.

(10) Patent No.: US 7,007,153 B1
(45) Date of Patent: Feb. 28, 2006

(54) METHOD AND APPARATUS FOR ALLOCATING FUNCTIONAL UNITS IN A MULTITHREADED VLIW PROCESSOR

(75) Inventors: Alan David Berenbaum, New York City, NY (US); Nevin Heintze, Morristown, NJ (US); Tor E. Jeremiassen, Somerset, NJ (US); Stefanos Kaxiras, Jersey City, NJ (US)

(73) Assignee: Agere Systems Inc., Allentown, PA (US)

( * ) Notice: Subject to any disclaimer, the term of this patent is extended or adjusted under 35 U.S.C. 154(b) by 472 days.

(21) Appl. No.: 09/538,670

(22) Filed: Mar. 30, 2000

(51) Int. Cl.
*G06F 15/00* (2006.01)
*G06F 15/76* (2006.01)

(52) U.S. Cl. .................... 712/24; 718/103; 718/107

(58) Field of Classification Search ............... 712/218, 712/24, 23; 717/149; 709/103, 107; 718/103, 718/107
See application file for complete search history.

(56) References Cited

U.S. PATENT DOCUMENTS

| | | | | |
|---|---|---|---|---|
| 5,404,469 A | * | 4/1995 | Chung et al. ................. | 712/24 |
| 5,574,939 A | * | 11/1996 | Keckler et al. ............... | 712/24 |
| 5,805,852 A | * | 9/1998 | Nakanishi ................... | 712/218 |
| 5,890,009 A | * | 3/1999 | Luick et al. .................. | 712/24 |
| 6,044,450 A | * | 3/2000 | Tsushima et al. ............. | 712/24 |
| 6,170,051 B1 | * | 1/2001 | Dowling ...................... | 712/225 |
| 6,216,220 B1 | * | 4/2001 | Hwang ........................ | 712/219 |
| 6,317,820 B1 | * | 11/2001 | Shiell et al. .................. | 712/32 |

FOREIGN PATENT DOCUMENTS

EP    0 827 071 A2    3/1998

OTHER PUBLICATIONS

Berkerman et al., "Performance and Hardware Complexity Tradeoffs in Designing Multithreaded Architectures," IEEE Proceedings of PACT, pp. 24-34 (1996).

(Continued)

*Primary Examiner*—Larry D. Donaghue (57) ABSTRACT

A method and apparatus are disclosed for allocating functional units in a multithreaded very large instruction word (VLIW) processor. The present invention combines the techniques of conventional VLIW architectures and conventional multithreaded architectures to reduce execution time within an individual program, as well as across a workload. The present invention utilizes a compiler to detect parallelism. The disclosed multithreaded VLIW architecture exploits program parallelism by issuing multiple instructions, in a similar manner to single threaded VLIW processors, from a single program sequencer, and also supports multiple program sequencers, as in simultaneous multithreading. Instructions are allocated to functional units to issue multiple VLIW instructions to multiple functional units in the same cycle. The allocation mechanism of the present invention occupies a pipeline stage just before arguments are dispatched to functional units. The allocate stage determines how to group the instructions together to maximize efficiency, by selecting appropriate instructions and assigning the instructions to the FUs. The criteria for selection are thread priority or resource availability or both. Under the thread priority criteria, different threads can have different priorities. The allocate stage selects and forwards the packets (or instructions from packets) for execution belonging to the thread with the highest priority according to the priority policy implemented. Under the resource availability criteria, a packet (having up to K instructions) can be allocated only if the resources (functional units) required by the packet are available for the next cycle. Functional units report their availability to the allocate stage.

16 Claims, 5 Drawing Sheets

OTHER PUBLICATIONS

Hirata et al., "An Elementary Processor Architecture with Simultaneous Instruction Issuing from Multiple Threads," Computer Architecture News, Association for Computing Machinery, vol. 20, No. 2, pp. 136-145 (1992).

Mombers et al., "A Multithreaded Multimedia Processor Merging On-Chip Multiprocessors and Distributed Vector Pipelines," Proceedings of IEEE Inter'l Symposium on Orlando, Florida, pp. 287-290 (1999).

* cited by examiner

310 {
L3: ADD R0, R1, R2
L2: SUB R3, R4, R2
L1: OR R6, R1, R5
}

METHOD AND APPARATUS FOR ALLOCATING FUNCTIONAL UNITS IN A MULTITHREADED VLIW PROCESSOR

CROSS-REFERENCE TO RELATED APPLICATIONS

The present invention is related to U.S. patent application Ser. No. 09/538,669 entitled "Method and Apparatus for Releasing Functional Units in a Multithreaded Very Large Instruction Word (VLIW) Processor," now U.S. Pat. No. 6,665,791; U.S. patent application Ser. No. 09/538,755 entitled "Method and Apparatus for Splitting Packets in a Multithreaded Very Large Instruction Word Processor," still pending; and U.S. patent application Ser. No. 09/538,757, entitled "Method and Apparatus for Identifying Splittable Packets in a Multithreaded Very Large Instruction Word Processor," now U.S. Pat. No. 6,658,551, each filed contemporaneously herewith, assigned to the assignee of the present invention and incorporated by reference herein.

FIELD OF THE INVENTION

The present invention relates generally to multithreaded processors, and, more particularly, to a method and apparatus for allocating functional units in such multithreaded processors.

BACKGROUND OF THE INVENTION

Figure 1:
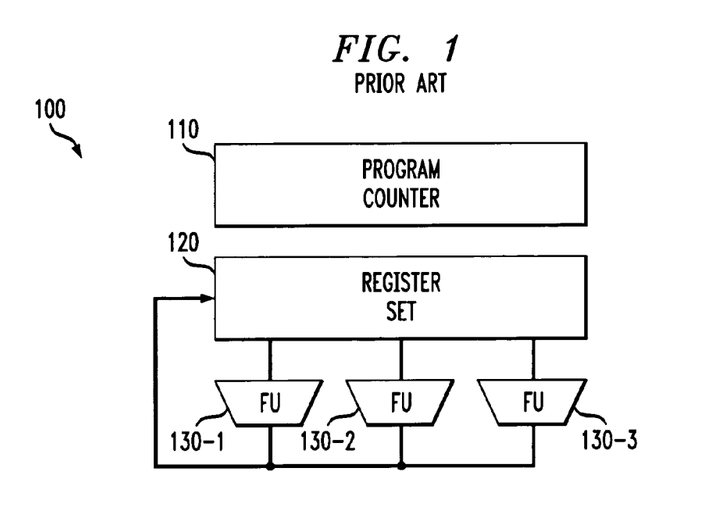
FIG. 1 illustrates a conventional generalized microprocessor architecture.

Computer architecture designs attempt to complete workloads more quickly. A number of architecture designs have been proposed or suggested for exploiting program parallelism. Generally, an architecture that can issue more than one operation at a time is capable of executing a program faster than an architecture that can only issue one operation at a time. Most recent advances in computer architecture have been directed towards methods of issuing more than one operation at a time and thereby speed up the operation of programs. FIG. 1 illustrates a conventional microprocessor architecture 100. Specifically, the microprocessor 100 includes a program counter (PC) 110, a register set 120 and a number of functional units (FUs) 130-N. The redundant functional units 130-1 through 130-N provide the illustrative microprocessor architecture 100 with sufficient hardware resources to perform a corresponding number of operations in parallel.

An architecture that exploits parallelism in a program issues operands to more than one functional unit at a time to speed up the program execution. A number of architectures have been proposed or suggested with a parallel architecture, including superscalar processors, very long instruction word processors and multithreaded processors, each discussed below in conjunction with FIGS. 2, 4 and 5, respectively. Generally, a superscalar processor utilizes hardware at run-time to dynamically determine if a number of operations from a single instruction stream are independent, and if so, the processor executes the instructions using parallel arithmetic and logic units (ALUs). Two instructions are said to be independent if none of the source operands are dependent on the destination operands of any instruction that precedes them. A very long instruction word processor evaluates the instructions during compilation and groups the operations appropriately, for parallel execution, based on dependency information. A multithreaded processor, on the other hand, executes more than one instruction stream in parallel, rather than attempting to exploit parallelism within a single instruction stream.

Figure 2:
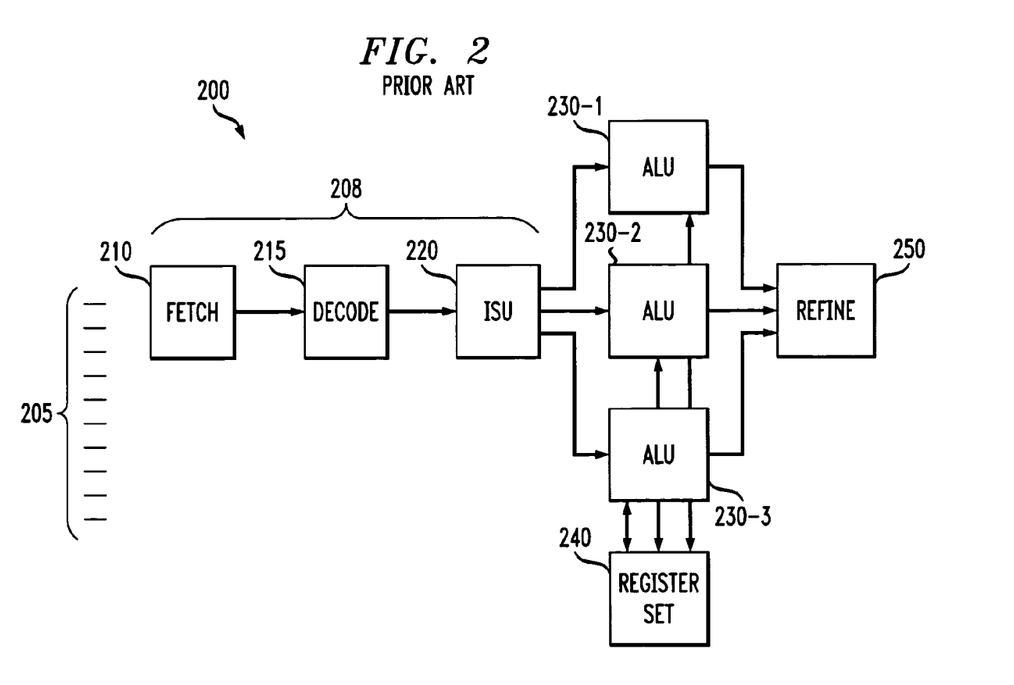
FIG. 2 is a schematic block diagram of a conventional superscalar processor architecture.

A superscalar processor architecture 200, shown in FIG. 2, has a number of functional units that operate independently, in the event each is provided with valid data. For example, as shown in FIG. 2, the superscalar processor 200 has three functional units embodied as arithmetic and logic units 230-N, each of which can compute a result at the same time. The superscalar processor 200 includes a front-end section 208 having an instruction fetch block 210, an instruction decode block 215, and an instruction sequencing unit 220 (issue block). The instruction fetch block 210 obtains instructions from an input queue 205 of a single threaded instruction stream. The instruction sequencing unit 220 identifies independent instructions that can be executed simultaneously in the available arithmetic and logic units 230-N, in a known manner. The refine block 250 allows the instructions to complete, and also provides buffering and reordering for writing results back to the register set 240.

Figure 3:
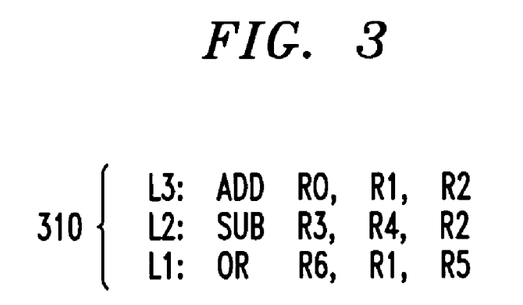
FIG. 3 is a program fragment illustrating the independence of operations.

In the program fragment 310 shown in FIG. 3, instructions in locations L1, L2 and L3 are independent, in that none of the source operands in instructions L2 and L3 are dependent on the destination operands of any instruction that precedes them. When the program counter is set to location L1, the instruction sequencing unit 220 will look ahead in the instruction stream and detect that the instructions at L2 and L3 are independent, and thus all three can be issued simultaneously to the three available functional units 230-N. For a more detailed discussion of superscalar processors, see, for example, James. E. Smith and Gurindar. S. Sohi, "The Microarchitecture of Superscalar Processors," Proc. of the IEEE (December 1995), incorporated by reference herein.

Figure 4:
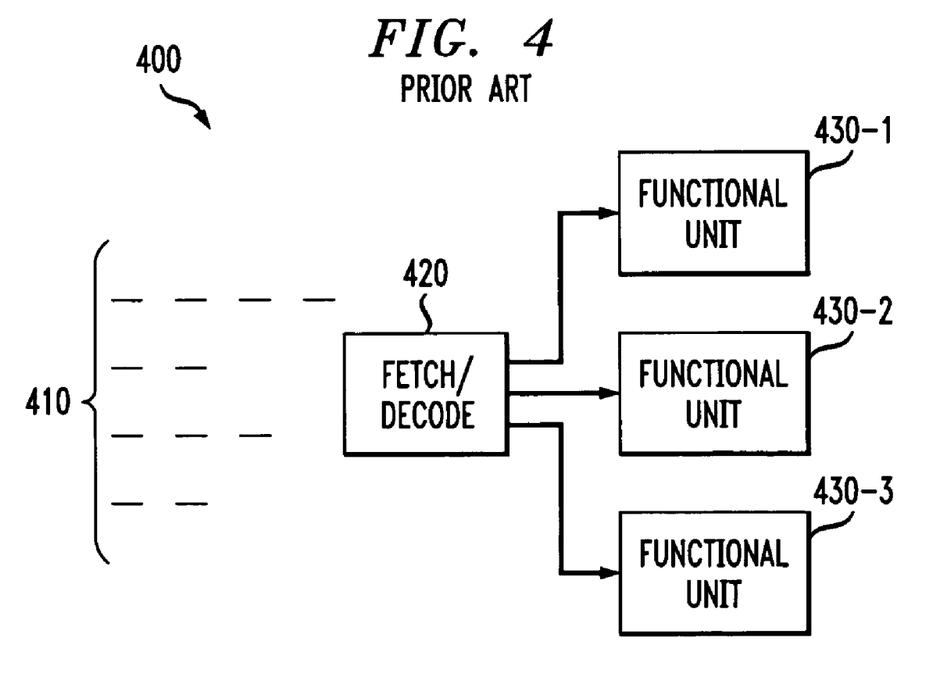
FIG. 4 is a schematic block diagram of a conventional very long instruction word processor architecture.

As previously indicated, a very long instruction word processor 400, shown in FIG. 4, relies on software to detect data parallelism at compile time from a single instruction stream, rather than using hardware to dynamically detect parallelism at run time. A VLIW compiler, when presented with the source code that was used to generate the code fragment 310 in FIG. 3, would detect the instruction independence and construct a single, very long instruction comprised of all three operations. At run time, the issue logic of the processor 400 would issue this wide instruction in one cycle, directing data to all available functional units 430-N. As shown in FIG. 4, the very long instruction word processor 400 includes an integrated fetch/decode block 420 that obtains the previously grouped instructions 410 from memory. For a more detailed discussion of very long instruction word processors, see, for example, Burton J. Smith, "Architecture and Applications of the HEP Multiprocessor Computer System," SPIE Real Time Signal Procesing IV, 241–248 (1981), incorporated by reference herein.

One variety of VLIW processors, for example, represented by the Multiflow architecture, discussed in Robert P. Colwell et al., "A VLIW Architecture for a Trace Scheduling Compiler," IEEE Transactions on Computers (August 1988), uses a fixed-width instruction, in which predefined fields direct data to all functional units 430-N at once. When all operations specified in the wide instruction are completed, the processor issues a new, multi-operation instruction. Some more recent VLIW processors, such as the C6x processor commercially available from Texas Instruments, of Dallas, Tex. and the EPIC IA-64 processor commercially available from Intel Corp, of Santa Clara, Calif., instead use a variable-length instruction packet, which contains one or more operations bundled together.

Figure 5:
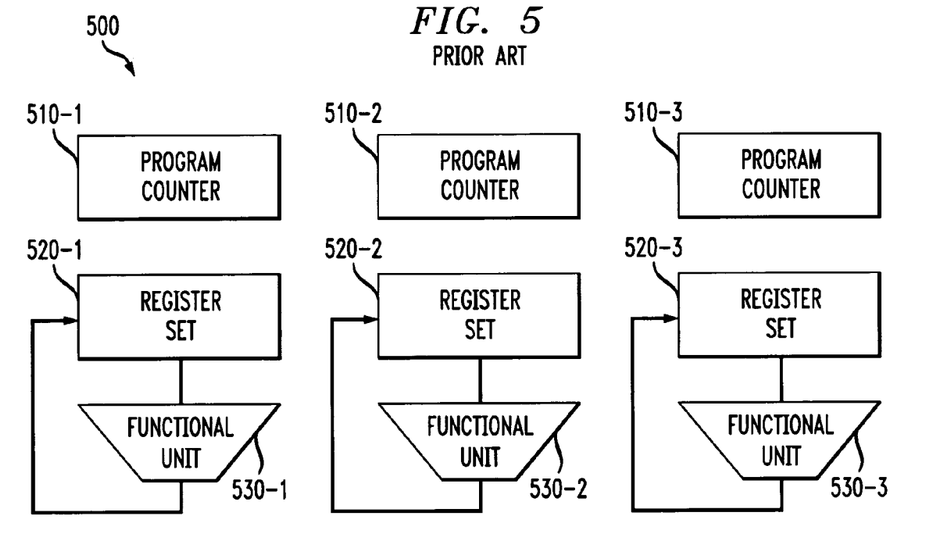
FIG. 5 is a schematic block diagram of a conventional multithreaded processor.

A multithreaded processor 500, shown in FIG. 5, gains performance improvements by executing more than one instruction stream in parallel, rather than attempting to exploit parallelism within a single instruction stream. The multithreaded processor 500 shown in FIG. 5 includes a program counter 510-N, a register set 520-N and a functional unit 530-N, each dedicated to a corresponding instruction stream N. Alternate implementations of the multithreaded processor 500 have utilized a single functional unit 530, with several register sets 520-N and program counters 510-N. Such alternate multithreaded processors 500 are designed in such a way that the processor 500 can switch instruction issue from one program counter/register set 510-N/520-N to another program counter/register set 510-N/520-N in one or two cycles. A long latency instruction, such as a LOAD instruction, can thus be overlapped with shorter operations from other instruction streams. The TERA MTA architecture, commercially available from Tera Computer Company, of Seattle, Wash., is an example of this type.

An extension of the multithreaded architecture 500, referred to as Simultaneous Multithreading, combines the superscalar architecture, discussed above in conjunction with FIG. 2, with the multithreaded designs, discussed above in conjunction with FIG. 5. For a detailed discussion of Simultaneous Multithreading techniques, see, for example, Dean Tullsen et al., "Simultaneous Multithreading: Maximizing On-Chip Parallelism," Proc. of the 22nd Annual Int'l Symposium on Computer Architecture, 392–403 (Santa Margherita Ligure, Italy, June 1995), incorporated by reference herein. Generally, in a Simultaneous Multithreading architecture, there is a pool of functional units, any number of which may be dynamically assigned to an instruction which can issue from any one of a number of program counter/register set structures. By sharing the functional units among a number of program threads, the Simultaneous Multithreading architecture can make more efficient use of hardware than that shown in FIG. 5.

While the combined approach of the Simultaneous Multithreading architecture provides improved efficiency over the individual approaches of the superscalar architecture or the multithreaded architecture, Simultaneous Multithreaded architectures still require elaborate issue logic to dynamically examine instruction streams in order to detect potential parallelism. A need therefore exists for a multithreaded processor architecture that does not require a dynamic determination of whether or not two instruction streams are independent. A further need exists for a multithreaded architecture that provides simultaneous multithreading. Yet another need exists for a multithreaded architecture that allocates functional units in such multithreaded processors in real-time.

SUMMARY OF THE INVENTION

Generally, a method and apparatus are disclosed for allocating functional units in a multithreaded very large instruction word processor. The present invention combines the techniques of conventional very long instruction word architectures and conventional multithreaded architectures. The combined architecture of the present invention reduces execution time within an individual program, as well as across a workload.

The present invention utilizes a compiler to detect parallelism in a multithreaded processor architecture. Thus, a multithreaded VLIW architecture is disclosed that exploits program parallelism by issuing multiple instructions, in a similar manner to single threaded VLIW processors, from a single program sequencer, and also supporting multiple program sequencers, as in simultaneous multithreading, but with reduced complexity in the issue logic, since a dynamic determination is not required.

The present invention allocates instructions to functional units to issue multiple VLIW instructions to multiple functional units in the same cycle. The allocation mechanism of the present invention occupies a pipeline stage before arguments are dispatched to functional units. Generally, the allocate stage determines how to group the instructions together to maximize efficiency, by selecting appropriate instructions, based on thread priorities or resource availability, or both, and assigning the instructions to the functional units.

The allocate stage selects the appropriate M instructions for execution from the (up to) N*K instructions that were fetched and decoded in the pipeline. The criteria for instruction selection are thread priority or resource availability or both. Under the thread priority criteria, different threads can have different priorities. The allocate stage selects and forwards the packets (or instructions from packets) for execution belonging to the thread with the highest priority according to the priority policy implemented. Under the resource availability criteria, a packet (having up to K instructions) can be allocated only if the resources (such as functional units) required by the packet are available for the next cycle. Functional units report their availability to the allocate stage.

A more complete understanding of the present invention, as well as further features and advantages of the present invention, will be obtained by reference to the following detailed description and drawings.

DETAILED DESCRIPTION

Figure 6:
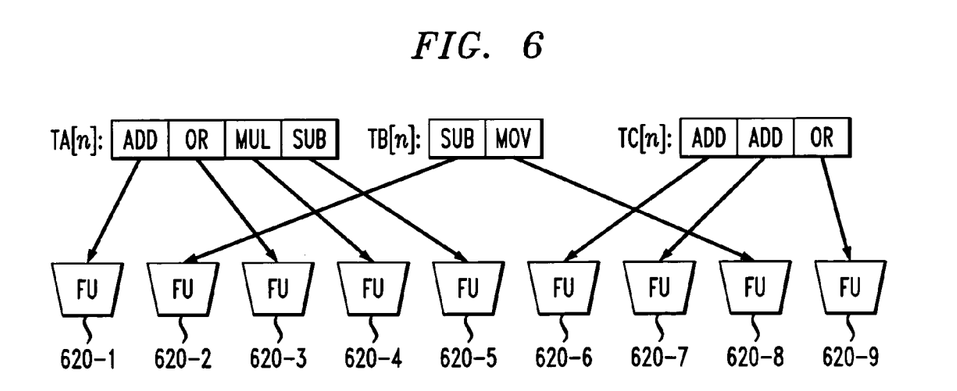
FIG. 6 illustrates a multithreaded VLIW processor in accordance with the present invention.

FIG. 6 illustrates a multithreaded VLIW processor 600 in accordance with the present invention. As shown in FIG. 6, there are three instruction threads, namely, thread A (TA), thread B (TB) and thread C (TC), each operating at instruction number n. In addition, the illustrative Multithreaded VLIW processor 600 includes nine functional units 620-1 through 620-9, which can be allocated independently to any thread TA-TC. Since the number of instructions across the illustrative three threads TA-TC is nine and the illustrative number of available functional units 620 is also nine, then each of the instructions from all three threads TA-TC can issue their instruction packets in one cycle and move onto instruction n+1 on the subsequent cycle.

It is noted that there is generally a one-to-one correspondence between instructions and the operation specified thereby. Thus, such terms are used interchangeably herein. It is further noted that in the situation where an instruction specifies multiple operations, it is assumed that the multi-threaded VLIW processor 600 includes one or more multiple-operation functional units 620 to execute the instruction specifying multiple operations. An example of an architecture where instructions specifying multiple operations may be processed is complex instruction set computer (CISC).

Figure 7A:
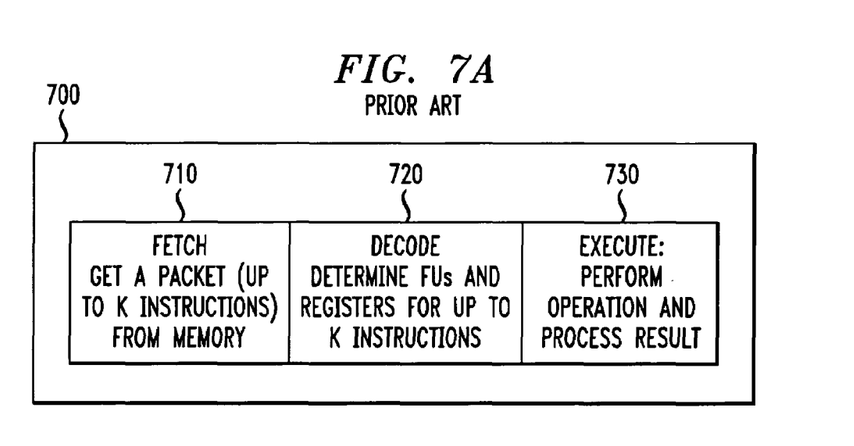
FIG. 7A illustrates a conventional pipeline for a multithreaded processor.

The present invention allocates instructions to functional units to issue multiple VLIW instructions to multiple functional units in the same cycle. The allocation mechanism of the present invention occupies a pipeline stage just before arguments are dispatched to functional units. Thus, FIG. 7A illustrates a conventional pipeline 700 comprised of a fetch stage 710, where a packet is obtained from memory, a decode stage 720, where the required functional units and registers are identified for the fetched instructions, and an execute stage 730, where the specified operations are performed and the results are processed.

Thus, in a conventional VLIW architecture, a packet containing up to K instructions is fetched each cycle (in the fetch stage 710). Up to K instructions are decoded in the decode stage 720 and sent to (up to) K functional units. The registers corresponding to the instructions are read, the functional units operate on them and the results are written back to registers in the execute stage 730. It is assumed that up to three registers can be read and up to one register can be written per functional unit.

Figure 7B:
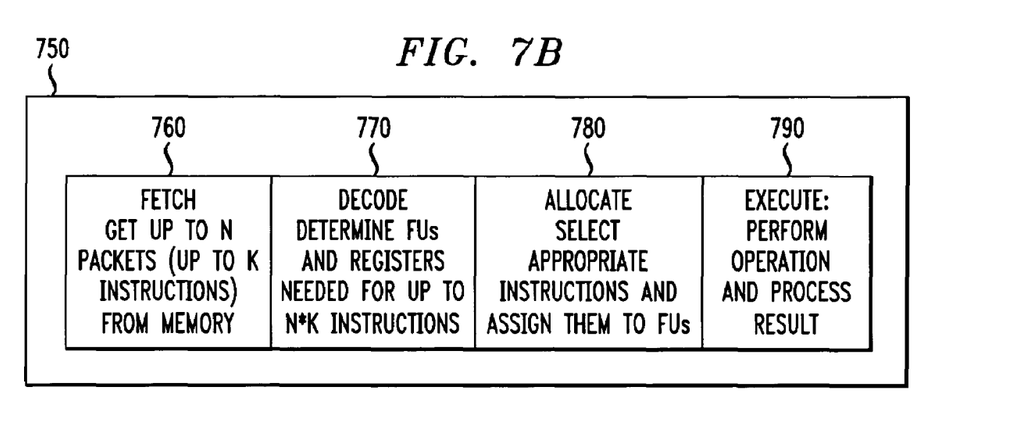
FIG. 7B illustrates a pipeline for a multithreaded processor in accordance with the present invention.
Figure 8:
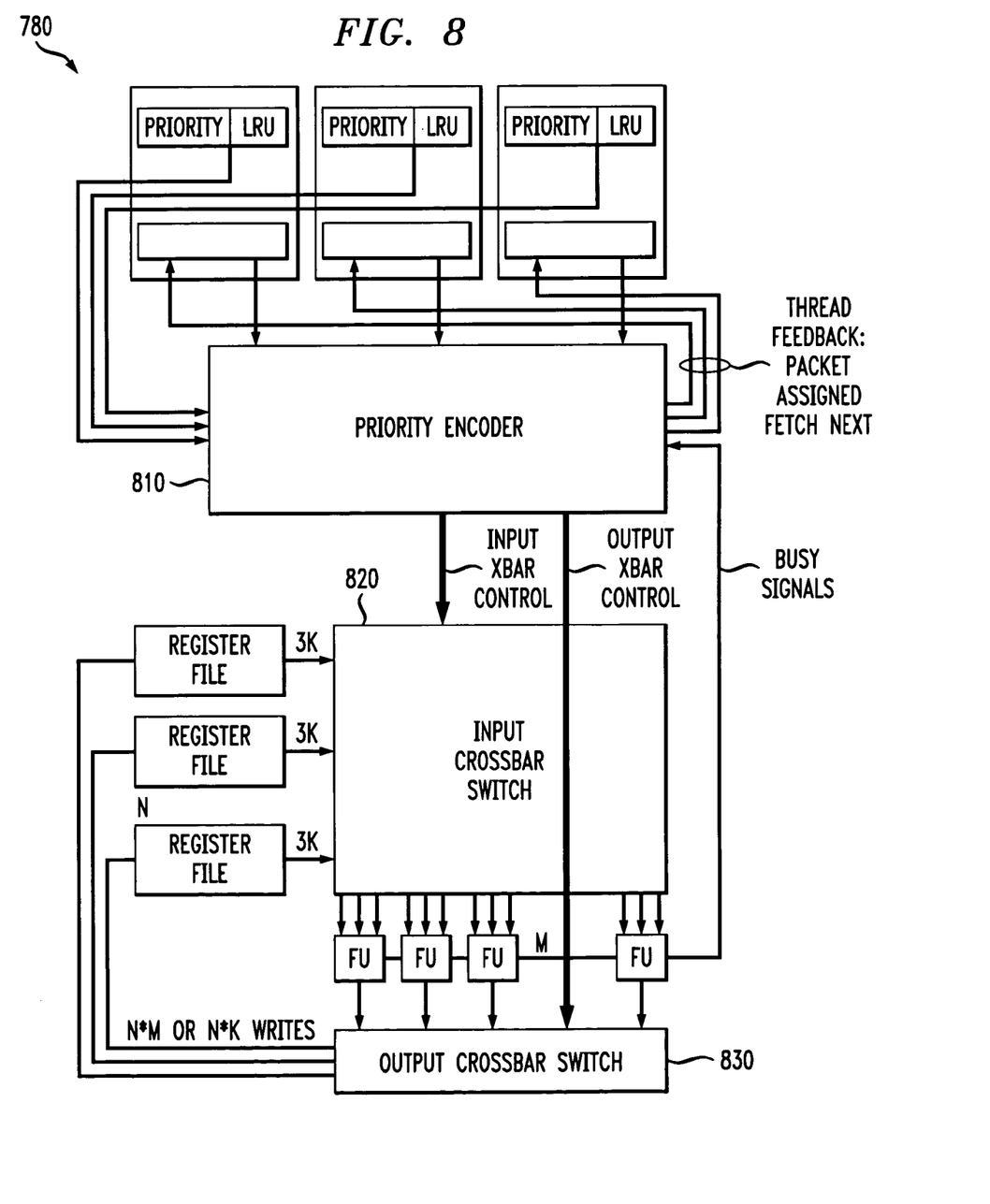
FIG. 8 is a schematic block diagram of an implementation of the allocate stage of FIG. 7B.

FIG. 7B illustrates a pipeline 750 in accordance with the present invention, where an allocate stage 780, discussed further below in conjunction with FIG. 8, is added for the implementation of multithreaded VLIW processors. Generally, the allocate stage 780 determines how to group the operations together to maximize efficiency. Thus, the pipeline 750 includes a fetch stage 760, where up to N packets are obtained from memory, a decode stage 770, where the functional units and registers are identified for the fetched instructions (up to N*K instructions), an allocate stage 780, where the appropriate instructions are selected and assigned to the FUs, and an execute stage 790, where the specified operations are performed and the results are processed.

In the multithreaded VLIW processor 600 of the present invention, up to N threads are supported in hardware. N thread contexts exist and contain all possible registers of a single thread and all status information required. A multithreaded VLIW processor 600 has M functional units, where M is greater than or equal to K. The modified pipeline stage 750, shown in FIG. 7B, works in the following manner. In each cycle, up to N packets (each containing up to K instructions) are fetched at the fetch stage 760. The decode stage 770 decodes up to N*K instructions and determines their requirements and the registers read and written. The allocate stage 780 selects M out of (up to) N*K instructions and forwards them to the M functional units. It is assumed that each functional unit can read up to 3 registers and write one register. In the execute stage 790, up to M functional units read up to 3*M registers and write up to M registers.

The allocate stage 780 selects for execution the appropriate M instructions from the (up to) N*K instructions that were fetched and decoded at stages 760 and 770. The criteria for selection are thread priority or resource availability or both. Under the thread priority criteria, different threads can have different priorities. The allocate stage 780 selects and forwards the packets (or instructions from packets) for execution belonging to the thread with the highest priority according to the priority policy implemented. A multitude of priority policies can be implemented. For example, a priority policy for a multithreaded VLIW processor supporting N contexts (N hardware threads) can have N priority levels. The highest priority thread in the processor is allocated before any other thread. Among threads with equal priority, the thread that waited the longest for allocation is preferred.

Under the resource availability criteria, a packet (having up to K instructions) can be allocated only if the resources (functional units) required by the packet are available for the next cycle. Functional units report their availability to the allocate stage 780.

FIG. 8 illustrates a schematic block diagram of an implementation of the allocate stage 780. As shown in FIG. 8, the hardware needed to implement the allocate stage 780 includes a priority encoder 810 and two crossbar switches 820, 830. Generally, the priority encoder 810 examines the state of the multiple operations in each thread, as well as the state of the available functional units. The priority encoder 810 selects the packets that are going to execute and sets up the first crossbar switch 820 so that the appropriate register contents are transferred to the functional units at the beginning of the next cycle. The output of the priority encoder 810 configures the first crossbar switch 820 to route data from selected threads to the appropriate functional units. This can be accomplished, for example, by sending the register identifiers (that include a thread identifier) to the functional units and letting the functional units read the register contents via a separate data network and using the crossbar switch 810 to move the appropriate register contents to latches that are read by the functional units at the beginning of the next cycle.

Out of the N packets that are fetched by the fetch stage 760 (FIG. 7B), the priority encoder 810 selects up to N packets for execution according to priority and resource availability. In other words, the priority encoder selects the highest priority threads that do not request unavailable resources for execution. It then sets up the first crossbar switch 810. The input crossbar switch 810 routes up to 3K*N inputs to up to 3*M outputs. The first crossbar switch 810 has the ability to transfer the register identifiers (or the contents of the appropriate registers) of each packet to the appropriate functional units.

Since there are up to N threads that can be selected in the same cycle and each thread can issue a packet of up to K instructions and each instruction can read up to 3 registers there are 3K*N register identifiers to select from. Since there are only M functional units and each functional unit can accept a single instruction, there are only 3M register identifiers to be selected. Therefore, the crossbar switch implements a 3K*N to 3M routing of register identifiers (or register contents).

The output crossbar switch 830 routes M inputs to N*M or N*K outputs. The second crossbar switch 830 is set up at the appropriate time to transfer the results of the functional units back to the appropriate registers. The second crossbar switch 830 can be implemented as a separate network by sending the register identifiers (that contain a thread identifier) to the functional units. When a functional unit computes a result, the functional unit routes the result to the given register identifier. There are M results that have to be routed to up to N threads. Each thread can accept up to K results. The second crossbar switch 830 routes M results to N*K possible destinations. The second crossbar switch 830 can be implemented as M buses that are connected to all N register files. In this case, the routing becomes M results to N*M possible destinations (if the register files have the ability to accept M results).

It is to be understood that the embodiments and variations shown and described herein are merely illustrative of the principles of this invention and that various modifications may be implemented by those skilled in the art without departing from the scope and spirit of the invention.

We claim:

1. A multithreaded very large instruction word processor, comprising:
   a plurality of functional units for executing a plurality of instructions from an instruction stream having a plurality of threads, said threads having a priority; and
   an allocator that selects instructions from said instruction stream and forwards said instructions to said plurality of functional units, said allocator selecting said instructions based on said thread priority and independently allocating said functional units to any thread in said multithreaded instruction stream.

2. The multithreaded very large instruction word processor of claim 1, wherein said thread priority allows different threads to have different priorities.

3. The multithreaded very large instruction word processor of claim 1, wherein said allocator selects and forwards said instructions for execution belonging to the thread with the highest priority.

4. The multithreaded very large instruction word processor of claim 1, wherein said allocator selects and forwards said instructions based on said thread priority and on a resource availability.

5. A multithreaded very large instruction word processor, comprising:
   a plurality of functional units for executing a plurality of instructions from a multithreaded instruction stream; and
   an allocator that selects instructions from said instruction stream and forwards said instructions to said plurality of functional units, said allocator selecting said instructions based on resource availability and independently allocating said functional units to any thread in said multithreaded instruction stream.

6. The multithreaded very large instruction word processor of claim 5, wherein said resource availability allows said instructions to be allocated only if the resources required by the instructions are available for the next cycle.

7. The multithreaded very large instruction word processor of claim 5, wherein said resources comprise said functional units.

8. The multithreaded very large instruction word processor of claim 5, wherein said allocator selects and forwards said instructions based on said resource availability and on a priority assigned to said threads.

9. A method of processing instructions from an instruction stream having a plurality of threads in a multithreaded very large instruction word processor, comprising the steps of:
   executing said instructions using a plurality of functional units, said threads having a priority;
   selecting instructions from said instruction stream based on said thread priority; and
   forwarding said selected instructions to said plurality of functional units, wherein said functional units can be allocated independently to any thread in said multithreaded instruction stream.

10. The method of claim 9, wherein said thread priority allows different threads to have different priorities.

11. The method of claim 9, wherein said selection step selects said instructions for execution belonging to the thread with the highest priority.

12. A method of processing instructions from an instruction stream having a plurality of threads in a multithreaded very large instruction word processor, comprising the steps of:
   executing said instructions using a plurality of functional units;
   selecting instructions from said instruction stream based on resource availability; and
   forwarding said selected instructions to said plurality of functional units, wherein said functional units can be allocated independently to any thread in said multithreaded instruction stream.

13. The method of claim 12, wherein said resource availability allows said instructions to be allocated only if the resources required by the instructions are available for the next cycle.

14. The method of claim 12, wherein said resources comprise said functional units.

15. An article of manufacture for processing instructions from an instruction stream having a plurality of threads in a multithreaded very large instruction word processor, comprising:
   a computer readable medium having computer readable program code means embodied thereon, said computer readable program code means comprising program code means for causing a computer to:
   execute said instructions using a plurality of functional units, said threads having a priority;
   select instructions from said instruction stream based on said thread priority; and
   forward said selected instructions to said plurality of functional units, wherein said functional units can be allocated independently to any thread in said multithreaded instruction stream.

16. An article of manufacture for processing instructions from an instruction stream having a plurality of threads in a multithreaded very large instruction word processor, comprising:
   a computer readable medium having computer readable program code means embodied thereon, said computer readable program code means comprising program code means for causing a computer to:
   execute said instructions using a plurality of functional units;
   select instructions from said instruction stream based on resource availability; and
   forward said selected instructions to said plurality of functional units, wherein said functional units can be allocated independently to any thread in said multithreaded instruction stream.

* * * * *